United States Patent

[11] 3,626,875

| [72] | Inventors | Charles N. Cleaves<br>Northboro;<br>Alvin M. Keller; David C. Mauro, both of<br>Marlboro, all of Mass. |
|---|---|---|
| [21] | Appl. No. | 95,832 |
| [22] | Filed | Dec. 7, 1970 |
| [45] | Patented | Dec. 14, 1971 |
| [73] | Assignee | KCM Industries, Inc.<br>Marlboro, Mass. |

[54] REFUSE DISPOSAL SYSTEM
18 Claims, 9 Drawing Figs.

[52] U.S. Cl. ............................................ 110/14, 110/15
[51] Int. Cl. ............................................. F23g 5/04
[50] Field of Search .................................. 110/8 R, 14, 15

[56] References Cited
UNITED STATES PATENTS

| 2,082,870 | 6/1937 | Caffrey | 110/14 |
| 2,148,447 | 2/1939 | Dundas et al. | 110/15 |
| 2,171,535 | 9/1939 | Berg et al. | 110/14 X |
| 1,974,250 | 9/1934 | Osborn | 110/15 |
| 3,304,894 | 2/1967 | Cox et al. | 110/15 |

Primary Examiner—Kenneth W. Sprague
Attorney—Weingarten, Maxhan and Schurgin

ABSTRACT: A system for the efficient disposal of solid and liquid refuse in which substantially uniform and complete combustion is achieved within a closed system with substantially no emission of harmful pollutants into the atmosphere. The system includes one or more rotary drying chambers for the drying and transport of shredded waste material to a rotary combustion chamber in which such material is consumed. Solid residue, mainly in the form of flyash, is collected in a water bath, while the gases of combustion are ignited in a secondary combustion chamber and processed to remove substantially all pollutants and cooled before release into the atmosphere.

Patented Dec. 14, 1971

INVENTORS
ALVIN M. KELLER
CHARLES N. CLEAVES
DAVID C. MAURO

BY

ATTORNEYS

Patented Dec. 14, 1971

INVENTORS
ALVIN M. KELLER
CHARLES N. CLEAVES
DAVID C. MAURO

BY Weingarten, Maxham & Schurgin

ATTORNEYS

Patented Dec. 14, 1971

INVENTORS
ALVIN M. KELLER
CHARLES N. CLEAVES
DAVID C. MAURO

BY

ATTORNEYS

Patented Dec. 14, 1971

INVENTORS
ALVIN M. KELLER
CHARLES N. CLEAVES
DAVID C. MAURO

BY

ATTORNEYS 3,626,875

REFUSE DISPOSAL SYSTEM

FIELD OF THE INVENTION

This invention relates to refuse disposal systems and more particularly to a closed pollution-free system having a rotary combustion chamber and one or more rotary drying chambers for the continuous processing of large quantities of refuse material.

BACKGROUND OF THE INVENTION

The disposal of rubbish, garbage and other refuse has become a major problem of urban life. Conventionally, refuse collected from homes, businesses and industrial plants has been accumulated in dumps located at various sites near respective areas of collection and either buried at the dump site or burned and then buried. Such treatment of refuse is no longer acceptable since these dumps are by their very nature esthetically undesirable and provide substantial hazard to health and the environment. Dump sites also result in extremely poor use of land which could otherwise be utilized for more efficient purposes. Burning of refuse has generally been accomplished in the open or in rather crude incinerators, resulting in inefficient or incomplete combustion of conglomerate waste material and a release of a considerable amount of pollutants into the atmosphere.

SUMMARY OF THE INVENTION

In accordance with the present invention, a refuse disposal system is provided in which large scale disposal of waste materials can be accomplished with extremely efficient combustion and substantially no release of pollutants into the environment. In brief, the invention embodies a novel incinerator capable of efficient combustion of great quantities of material and cooperative with shredding apparatus for reducing raw refuse into a generally homogeneous form for more efficient combustion and also cooperative with output processing apparatus for the safe removal of residual components of the incineration process prior to release of harmless constituents into the atmosphere.

The novel incinerator itself comprises one or more rotary drying chambers arranged to receive shredded refuse and operative to convey such refuse along the length thereof and to dry and blend the material as it is conveyed through the drying chambers to a rotary combustion chamber. The combustion chamber includes a conically shaped inner section attached to and supported within an outer conically shaped section, both sections having helical vanes formed therein to provide transport of dry material in a sinuous path from the inner section into the outer section and thence into a rotary residue chamber coaxially aligned with the combustion chamber and also having helical vanes for the axial transport of residue therethrough.

The combustion and residue chambers are each supported for independent rotation about their respective longitudinal axes. A variable speed drive is provided to control the rotational speed of the drying, combustion and residue chambers at rates sufficient to permit maintenance of selected operating temperatures and predetermined processing capacity. The incinerator is fully enclosed and includes means for collection of ash and for the collection and processing of the gases of combustion to remove harmful constituents therefrom and to cool gases prior to release into the atmosphere.

DESCRIPTION OF THE DRAWINGS

The invention will be more fully understood from the following detailed description taken in conjunction with the accompanying drawings, in which.

DETAILED DESCRIPTION OF THE INVENTION

Figures 1, 7, 8:
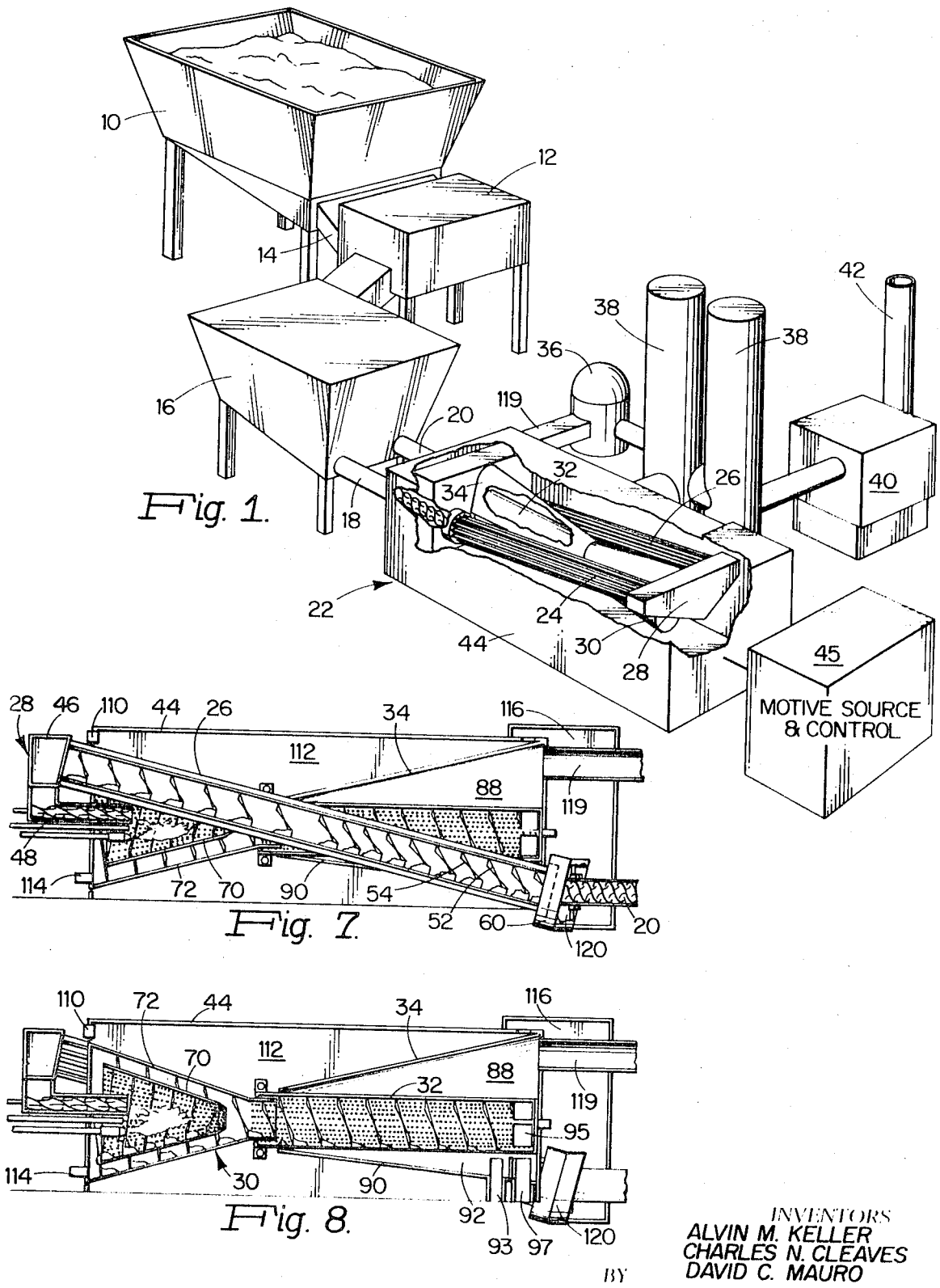
FIG. 1 is a pictorial view, partly cutaway of a refuse disposal system according to the invention.
FIG. 7 is a sectional elevational view of the invention illustrating the flow of material through the drying chamber and into the combustion chamber.
FIG. 8 is a sectional elevational view of the invention illustrating the flow of material through the combustion and residue chambers.

The novel refuse disposal system is illustrated in FIG. 1 and is composed of several modular units each of which can be transportable and easily installed at an operating site. Solid refuse material to be incinerated is stored in a bin 10 and is conveyed to a shredder 12 by means of a chain belt or other suitable conveyor apparatus 14. The shredder 12 is operative to provide a generally homogeneous shredded material which is combustible in a more uniform manner than directly burning a conglomerate waste material, which is usually a collection of constituents of widely different sizes and burning characteristics. The shredded material is conveyed from shredder 12 to a storage bin 16 which communicates with a pair of screw conveyors 18 and 20, each of which transports shredded material from bin 16 to the input end of the incinerator 22.

The incinerator 22 includes first and second rotary drying chambers 24 and 26 each arranged to accept shredded material from a respective screw conveyor 18 and 20, and each operative to dry materials as they are transported along the length thereof. The dried and shredded material in chambers 24 and 26 is transported to conveyor apparatus 28 which is operative to feed the dried material into the combustion chamber 30 which is also rotatable and which communicates with a rotatable residue chamber 32. The residue chamber has a perforated wall surface and is disposed within a housing 34 in which the gases of combustion are collected. These gases are drawn from chamber 32 into gas processing apparatus for removal of harmful constituents therein and for cooling prior to release of harmless gases, mainly carbon dioxide, into the atmosphere. Typically, the gases of combustion are conveyed to a secondary combustion chamber 36, the output of which is coupled to a pair of cascaded cooling towers 38, which, in turn, are coupled to a dust bin 40 having a stack 42 coupled to the output thereof. A housing 44 is provided around the entire incinerator 22 to provide a substantially closed system to further reduce the chance for emission of noxious pollutants into the atmosphere. This gas processing apparatus is well known and can be readily assembled from commercially available components.

A motive source and control circuitry 45 are provided to accomplish intended rotation of chambers 24, 26, 30 and 32, and also to control operation of conveyors 14, 18, 20 and 28. Typically, a separate motor drive is provided for combustion chamber 30, residue chamber 32 and the drying chambers 24 and 26. Each drive is of the variable speed type such that respective chambers of the incinerator can be rotated at different rates. Similarly, the conveyors 14, 18, 20 and 28 are each separately controllable to provide intended material flow. The variable speed control of a plurality of system elements is accomplished by means which are per se well known. By control of the respective conveyors and rotary chambers of the novel incinerator, material is conveyed at speeds to maintain an intended temperature within the combustion chamber. Temperature sensors can be provided within the incinerator for monitoring temperatures at respective positions therein and measurements provided by these sensors can be displayed on a control panel and can also be employed in a well-known closed loop servosystem for automatic control of system speeds to maintain predetermined operating temperatures.

Figure 3:
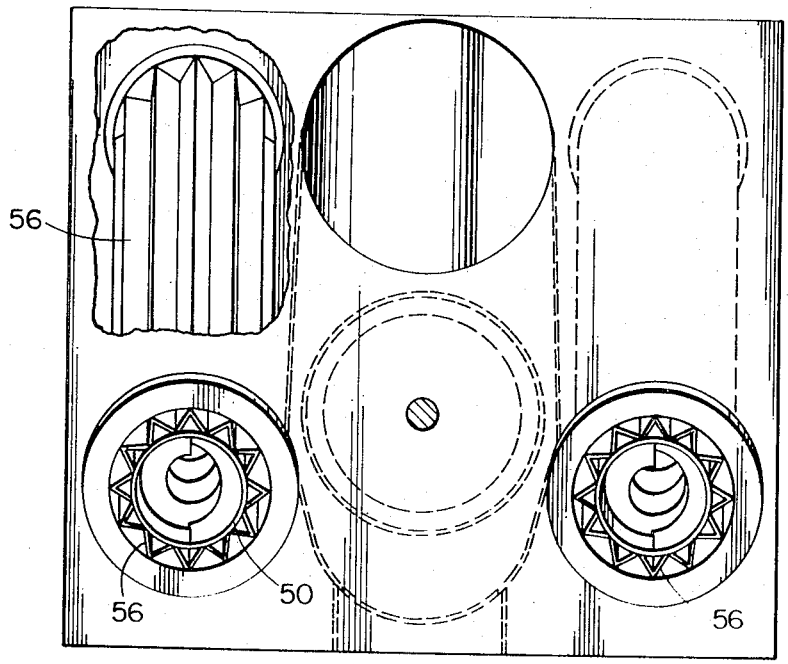
FIG. 3 is a cutaway end view of the drying chambers employed in the invention.
Figure 2:
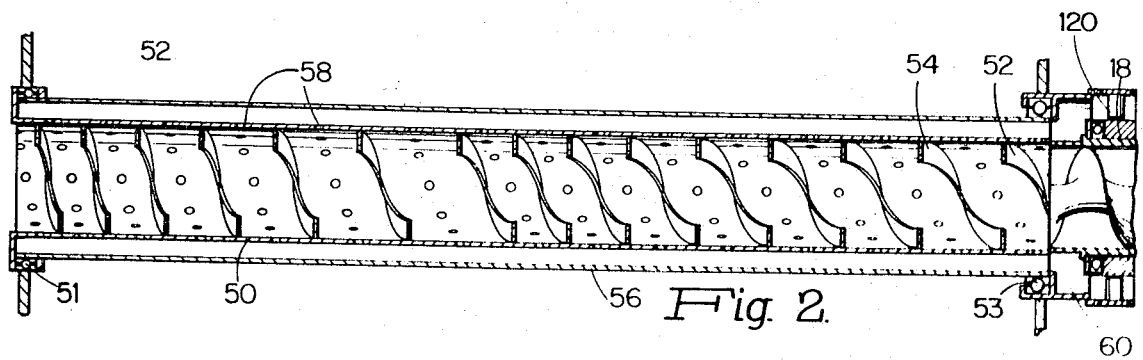
FIG. 2 is a sectional elevation of a drying chamber embodied in the invention.

A drying chamber employed in the incinerator 22 is shown more particularly in FIGS. 2 and 3 and includes a cylindrical metal tube 50 having formed on the inside surface thereof a helical vane or flight 52 of a pitch which decreases from the right-hand end in the illustrated embodiment to the left-hand end thereof, that is the vane 52 has a greater number of turns per foot of length at the left-hand than at the right-hand end thereof. A second helical vane 54 can also be provided in an interleaved manner with the first vane along a portion of the tube as illustrated. The double flight structure provides rapid longitudinal conveyance of materials through the portion of tube 50 having these double flights in order to rapidly convey materials into the drying chamber to commence the drying process. The changing pitch of the first vane 52 also assists in rapidly conveying material near the input end of the chamber and more slowly conveying the material along the output end thereof where major heat from the drying chamber is applied for effectuating the drying process. The pitch of vane 52 can be continuously changing from the input to the output ends of tube 50, or alternatively, can be of uniform pitch near the input end, and of a shorter uniform pitch near the output end to provide the increased material travel. Several regions of progressively shorter pitch can also be employed.

A plurality of angle irons 56 are provided axially along the tube 50 and are attached as illustrated to the outer wall thereof. The angle irons each extend substantially along the full length of tube 50 and provide a means for introducing air to the chamber to assist in the drying process. Openings 58 are provided through the wall of tube 50 at spaced intervals along the length thereof to provide communication between the passages within angle irons 56 and the interior of tube 50. A fluid coupling 60 is provided at the input end of the drying chamber to introduce heated air into the chamber. The chamber is supported for rotation typically at its ends by bearing flanges 51 and 53.

Figure 4:
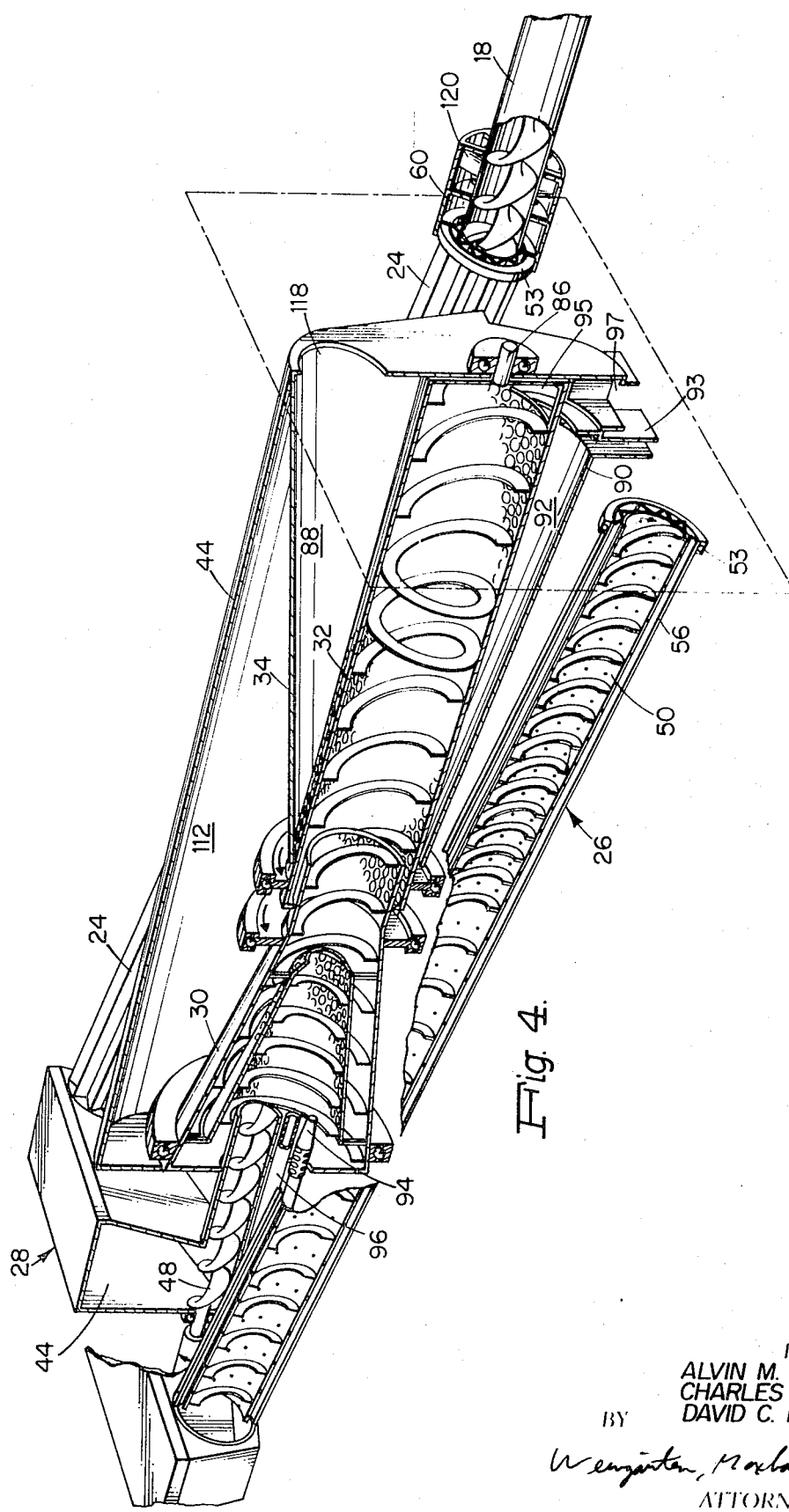
FIG. 4 is a cutaway pictorial view of a novel incinerator embodied in the invention.

Each drying chamber 24 and 26 is arranged as shown in FIG. 4 in an inclined disposition to convey shredded material through the dryers and into conveyor 28 which, in turn, transports the dried shredded material into combustion chamber 30. A portion of each drying chamber is adjacent to combustion chamber 30 and is heated by radiation therefrom. As will be described below, forced air is introduced by way of fluid coupling 60 disposed at the input end of each drying chamber 24 and 26 into the passages defined by angle irons 56 to cause a flow of air therethrough and into the combustion chamber via openings 58 in the wall thereof. The flow of air aids in the drying process and also assists in preventing material being conveyed through the drying chambers from bunching and compacting. As a result, more complete drying is achieved to permit efficient combustion of materials entering the combustion chamber. Heated air within chamber 112, heated by the combustion chamber, is recirculated through the drying chambers 24 and 26 to enhance material drying. The output end of each drying chamber communicates with the bin 44 of conveyor apparatus 28 and is in sealing engagement therewith. The bin 44 is substantially airtight such that air within the drying chambers flows within bin 44 and through screw auger 48 into the combustion chamber without material leakage into the atmosphere. The inclined disposition of the drying chambers is effective to permit dry and lighter materials to be carried by airflow through the drying chambers to the combustion chamber, while heavier and more moist materials are more slowly conveyed by action of the vanes through the drying chambers. In this manner, materials tend to remain in the chambers 24 and 26 for a time corresponding to the degree of drying required.

Figure 9:
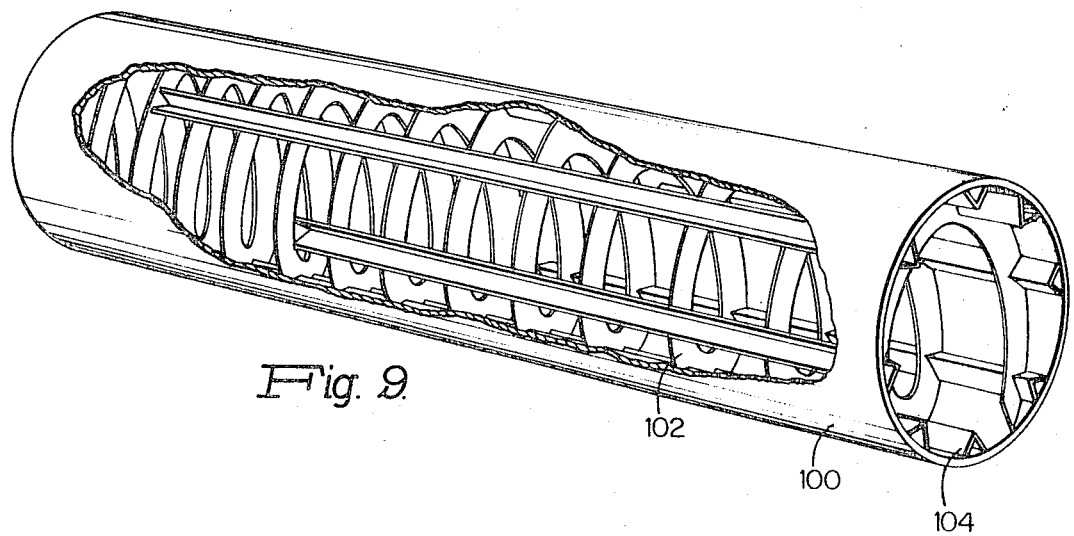
FIG. 9 is a pictorial view partly cut away of an alternative drying chamber useful in the invention.

An alternative drying chamber construction is shown in FIG. 9 wherein the airflow passages are formed within the cylindrical tube. Referring to the figure, a cylindrical metal tube 200 has formed on the inside surface thereof a helical vane or flight 102 of a pitch which decreases from the right-hand end in the illustrated embodiment to the left-hand end thereof. Upon rotation of tube 100, material introduced into the right-hand input end is thus conveyed at a progressively slower longitudinal rate toward the output end of the tube. As described above, material being conveyed through the drying chamber is more slowly transported in the region of higher heat to maximize the drying process. A double flight structure such as described in connection with FIG. 2 can also be provided in this embodiment to achieve more rapid transport of material into the chamber at the input end thereof. Alternatively, the vane 102 can be of different uniform pitches along the length of tube 100 to provide slower travel of material near the high-heat region. A plurality of angle irons 104 are affixed to the interior surface of tube 100 and circumferentially are disposed at regularly spaced intervals, and axially are of different lengths within the chamber. The angle irons 104 thus terminate at different positions along the length of the drying chamber and provide means for introducing air from the input end of the chamber to respective positions within the chamber.

Figure 5:
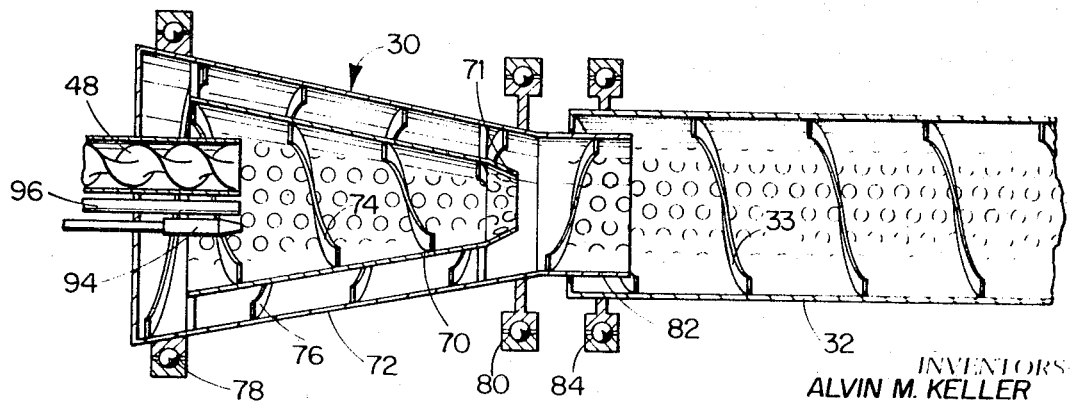
FIG. 5 is a sectional elevational view of a combustion chamber embodied in the invention.

The combustion chamber 30 is illustrated more particularly in FIGS. 4 and 5 and includes an inner perforated conical section 70 supported in spaced-apart relationship within an outer imperforate conical section 72. A helical vane 74 is formed on the inner surface of section 70, while a helical vane 76 is formed on the inner surface of section 72. Combustion chamber 30 is supported as illustrated with its longitudinal axis generally horizontal on bearing surfaces provided. More specifically, a bearing flange 78 is provided around outer section 72 near the larger end thereof, while a similar bearing flange 80 is provided around the narrower end of section 72.

Figure 6:
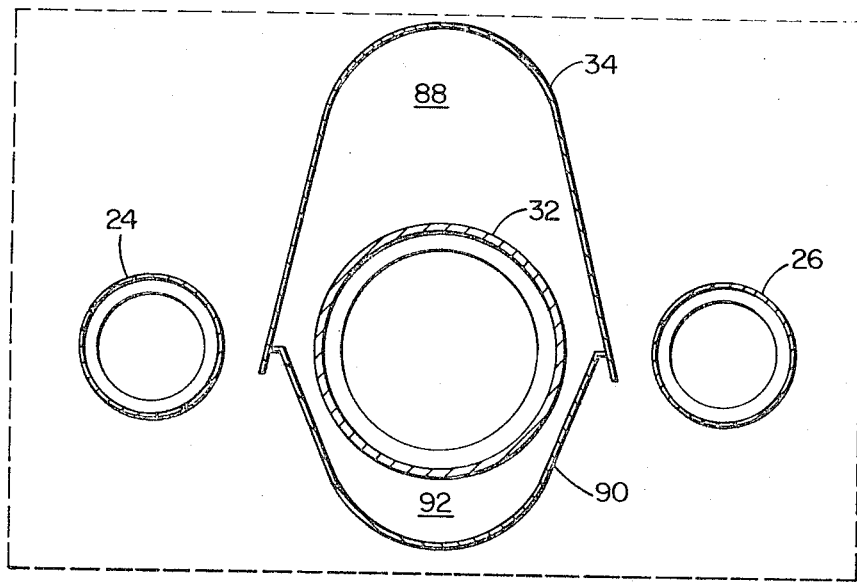
FIG. 6 is a diagrammatic end view illustrating the arrangement of elements of the novel incinerator.

A perforated portion 82 which forms an extension of section 72 is disposed within the input end of residue chamber 32, which is also perforated substantially along its entire length. The residue chamber contains a helical flight 33 formed on the inside surface thereof, and is supported coaxially with combustion chamber 30 for rotation about the common axis at a rate which may be the same or different from the rotational rate of the combustion chamber. Residue chamber 32 is supported at this input end by means of a bearing flange 84, and at its outer end by means of a bearing shaft 86 in alignment with the rotational axis. An enclosure 34 is provided around the upper half of residue chamber 32 and is configured and disposed in the manner illustrated to define a chamber 88 which flares from the input end of the chamber outwardly towards the output end thereof. A second enclosure 90 is provided around the lower half of residue chamber 32 and is also disposed to define a chamber 92 which outwardly extends toward the output end of residue chamber 32. A housing 44 is provided around the entire incinerator and, as will be described, means are provided for recirculating air and gases from within the housing back into the drying chambers for use in the incineration process. The relative arrangement of chamber 32 and enclosures 34 and 90 are shown in end view in FIG. 6.

The inner section 70 has a tapered nozzle portion 71 formed as an extension of the narrower end of section 70. This nozzle portion is operative to aid in the precipitation of solid particles entering residue chamber 32. Air and gases are caused to flow through combustion chamber 30 and into residue chamber 32, the gases being released through the perforated wall of chamber 32 into chamber 88 defined by enclosure 34. Since the residue chamber 32 is of larger diameter than the diameter of the exit end of combustion section 70, the pressure and velocity of gas entering residue chamber will be reduced resulting in precipitation of solid particles carried by the gas stream. The nozzle 71 serves to produce a more defined gas stream in order to more readily propel the gas and particles carried thereby into residue chamber 32 wherein the suspended particles are precipitated.

The chamber 92 disposed below the residue chamber contains water in which ash and other residue is deposited through the perforations in the wall of chamber 32. A pipe 93 is provided near the output end of chamber 32 which communicates with chamber 92. This pipe 93 is coupled through a suitable valve mechanism to a tank into which the residue-containing water from chamber 92 can be drained. A plurality of openings 95 are provided circumferentially in the wall of residue chamber 32 adjacent the output end thereof, these openings being dimensioned to permit removal of unburned items such as metal parts which are not consumed during incineration. A chute 97 is provided below the output end of residue chamber 32 in a position to receive unconsumed items which are transported through the chamber and through openings 95. This chute is usually communicative with a waste bin into which the unconsumed metal and other items are accumulated.

A screw auger 48 is disposed within the larger end of conical section 70 and is operative to transport shredded and dried material axially into the combustion chamber. A heater 94, which typically is a gas or oil burner, maintains a flame within section 70 and heats the combustion chamber to a predetermined operating temperature. The helical vane 74 formed on the inner surface of section 70 is operative, during rotation of the combustion chamber, to convey materials therein toward the larger end of section 70 and thence into the associated portion of section 72. The helical vane 76 provided on the inner surface of section 72 is operative to provide, during combustion chamber rotation, transport of materials through the portion 82 at the output end of the combustion chamber and thence into residue chamber 32. Inner section 70 and portion 80 are perforated substantially around the entire wall surfaces thereof to provide efficient heat transfer between sections 70 and 72 and also to permit the transfer of burned residue into section 72. The flow of materials through the combustion chamber is in a sinuous path from screw conveyor 28 toward the narrower end of the combustion chamber and thence back toward the input end thereof, and through section 72 outwardly into residue chamber 32. Thus, a relatively long path is provided within the combustion chamber to permit efficient incineration within a relatively small structure.

A pipe 96 can be provided adjacent auger 48 with one end communicating with combustion chamber 30 for the introduction of liquid waste into the combustion chamber for consumption. The pipe 96 may include a nozzle for spraying the liquid waste into the combustion chamber. Liquid introduced into the combustion chamber is readily converted therein to a gaseous state, the resulting gases being removed from the incinerator and processed in the manner described to remove any harmful constituents prior to release of any gases into the atmosphere. The invention is thus operative to provide for the efficient disposal of liquid as well as solid waste materials.

The flow of material through the drying chambers 24 and 26 and into the combustion chamber 30 is illustrated in FIG. 7. Although only a single drying chamber 26 is visible, it will be appreciated that the construction and operation of both drying chambers is identical. The drying chambers are arranged in inclined disposition with the input end lower than the output end thereof. It is seen that shredded refuse is conveyed via screw conveyor 20 into the input end of drying chamber 26, which, as described, has formed on the inner wall thereof a helical vane 52 which is of a pitch which is decreasing along the length of the chamber progressing toward the output end thereof for the purpose of advancing materials therein at a slower rate at the region within the chamber of greatest heat to thereby aid in the drying process. A second vane 54 is interleaved with vane 52 as described above, to rapidly move materials into chamber 26. Chamber 26 is disposed by bearing surfaces on the extremities thereof for rotation about its longitudinal axis under the power of a suitable motive source. The region of highest heat is adjacent the combustion chamber 30 and it will be appreciated that especially effective drying is accomplished since the material being conveyed through chamber 26 moves more slowly in this region of highest heat. Dried material at the output end of chamber 26 is deposited into a bin 46 which is part of the conveyor assembly 28 which supplies the dried material to a screw conveyor 48 for transport into combustion chamber 30.

The processing of material through the combustion chamber is illustrated in FIG. 8. The conical section 70 includes on the inner surface thereof a helical vane 74 of substantially uniform pitch and of a lay to provide transport of materials therein toward the wider end upon rotation of the combustion chamber. The conical section 72 also includes a helical vane 76 formed on the inner surface thereof of opposite lay to vane 74 such that conveyance of material is provided from the wider end of section 72 to the narrower end thereof. Dried and shredded material being conveyed by conveyor 48 into section 70 is therefor transported as described above in a long sinuous path through both sections 70 and 72 and thence into residue chamber 32.

A draft is provided throughout the incinerator to draw gases and suspended particles into output processing apparatus for removal of harmful constituents. A regulator valve 110 is provided in a wall of housing 44 and is adjustable to permit a selected amount of airflow from the atmosphere into the space 112 contained within housing 44. Another regulator valve 114 is provided at the input end of combustion chamber 30 to permit selected airflow therein from the atmosphere. An enclosure is provided around the output end of the incinerator including the input end of drying chambers 24 and 26. A blower 120 is associated with each fluid coupling 60 to permit heated air being drawn into enclosure 116 from chamber 112 to be recirculated into the drying chambers. The gases within chamber 88 are drawn via tube 119 coupled to opening 118 into the secondary combustion chamber 36 and thence into the output processing apparatus for cooling and removal of harmful constituents.

It will be appreciated that the invention provided processing of both liquid and solid waste materials in a manner which is economically efficient and in a manner which is substantially without adverse affect on the ecology. The size, weight and moisture content of refuse material to be consumed is controlled to a relatively fine degree. The rotational rates of the components of the novel incinerator are also individually controllable to permit maintenance of effective combustion temperatures and efficient removal of residue from the incinerator. By virtue of the draft provided within the novel incinerator, lighter materials are drawn through the combustion chamber and into the residue chamber and are consumed in their flight through the combustion chamber, while heavier materials requiring a greater amount of heat for incineration are conveyed more slowly through the combustion chamber by means of the relatively long combustion path provided by the inner and outer sections thereof. Gases which are emitted by the incineration process are contained within an enclosure and are withdrawn from the incinerator into a secondary burner 36 and subsequent gas processing apparatus. Thus, harmful constituents are not released into the atmosphere but are isolated from harmless gas components which are cooled and then released to the environment. Heated air is recirculated through the drying chambers back into the combustion chamber to further enhance the efficiency of system operation.

In a typical incinerator which is part of a refuse disposal system designed to process 3-5 tons of solid waste material per hour, the incinerator is approximately 45 feet long, with a combustion chamber 30 having a 6-foot input end diameter and a 3-foot output end diameter. The residue chamber 32 is approximately 4 feet in diameter, while the drying chambers 24 and 26 are each of a diameter of 2 feet. The combustion chamber is maintained at a temperature typically in the range of 2200°-2600° F. Gases drawn from the incinerator are cooled to a temperature of approximately 300°-400° F. in order to prevent damage to filters within dust bin 40 used to collect fly ash which may be suspended within the cooled gas.

In addition, it is useful to cool the gases prior to emission into the atmosphere to prevent unnecessary heating of the surrounding environment. The incinerator is formed of steel with the combustion chamber 30 usually being fabricated of high temperature stainless steel.

By virtue of heat radiated into the drying chambers from the combustion chamber, shredded waste being transported through the drying chambers is heated to a predetermined degree prior to entry of this material into the combustion chamber. The degree of heat maintained within the drying chambers and the length of conveyance time therethrough is selected to permit substantial drying of materials being conveyed through the drying chambers, such that materials supplied to combustion chamber 30 are entirely consumed and incineration accomplished in a conveniently short time. The generally uniform blending of waste materials provided by the shredding process and by operation of rotary drying chambers 24 and 26 also aids in the efficient combustion of materials since the shredded material has a generally uniform combustion characteristic as compared with the widely varying characteristics normally found in conglomerate refuse. In order to prevent premature combustion of plastics and other materials within the drying chambers 24 and 26, it is usually preferable to maintain these chambers at a temperature less than 750° F.

From the foregoing, it will be appreciated that the invention provides an improved, highly efficient refuse disposal system for the incineration of liquid and solid materials and for the removal of harmful constituents of combustion prior to release of any gases into the atmosphere. The system is fully controllable to afford selected operation to achieve efficient combustion suiting the characteristics and quantities of particular materials being consumed. Moreover, the system provides large scale refuse disposal suitable, for example, for municipal refuse operations while maintaining substantially pollution-free performance. Various modifications and alternative implementations will occur to those versed in the art and it is not intended to limit the invention by what has been particularly shown and described except as indicated in the appended claims.

What is claimed is:

1. A refuse disposal system comprising:
   means for shredding conglomerate refuse materials into a generally uniform material blend of shredded material having substantially uniform size and burning characteristics;
   a rotary combustion chamber having an input end, an output end, and an inner and an outer section each having conveyor means therein operative upon rotation of said chamber to transport shredded materials in a sinuous path in said inner and outer sections between said input end and said output end;
   means for establishing and maintaining a predetermined operating temperature within said combustion chamber;
   a rotary residue chamber disposed adjacent said combustion chamber with one end in communication with the output end of said combustion chamber and including conveyor means therein for transport of materials from said combustion chamber through said residue chamber;
   means disposed in operative arrangement with said residue chamber for collecting said residue from the combustion process;
   means disposed in operative arrangement with said residue chamber for collecting gases from the combustion process released from said residue chamber;
   at least one rotary drying chamber disposed adjacent said combustion and residue chambers and having conveyor means therein for transporting shredded material from said shredding means to the input end of said combustion chamber;
   means for directing forced air into said at least one drying chamber, said combustion chamber and said residue chamber; and
   apparatus for removing harmful constituents of the gases from said gas collecting means prior to release of gas into the atmosphere.

2. A refuse disposal system according to claim 1 wherein said means for establishing and maintaining a predetermined operating temperature includes:
   a heater disposed at the input end of said combustion chamber;
   and wherein said combustion chamber conveyor means is operative to transport said shredded materials during a portion of said sinuous path toward said heater.

3. A refuse disposal system comprising:
   means for shredding conglomerate refuse materials into a generally uniform material blend of shredded material having substantially uniform size and burning characteristics;
   a rotary combustion chamber having an input end, an output end, and conveyor means therein for transport of shredded materials in a sinuous path between said input end and said output end;
   said rotary combustion chamber including
   an outer conically shaped section having a smaller end thereof in communication with said residue chamber;
   an inner conically shaped section disposed within said outer section in spaced apart relationship therewith and having a plurality of perforations through the wall thereof;
   a first helical vane provided on the inner surface of said inner section of a pitch operative upon rotation of said combustion chamber to cause conveyance of shredded materials from the smaller end thereof toward the larger end; and
   a second helical vane provided on the inner surface of said outer section of opposite pitch to the helical vane provided in said inner section to provide upon rotation of said combustion chamber conveyance of material from the larger end of said outer section to the smaller end thereof;
   means for establishing and maintaining a predetermined operating temperature within said combustion chamber;
   a rotary residue chamber disposed adjacent said combustion chamber with one end in communication with the output end of said combustion chamber and including conveyor means therein for transport of materials from said combustion chamber through said residue chamber;
   means disposed in operative arrangement with said residue chamber for collecting solid residue from the combustion process;
   means disposed in operative arrangement with said residue chamber for collecting gases from the combustion process released from said residue chamber;
   at least one rotary drying chamber disposed adjacent said combustion and residue chambers and having conveyor means therein for transporting shredded material from said shredding means to the input end of said combustion chamber;
   means for directing forced air into said at least one drying chamber, said combustion chamber and said residue chamber; and
   apparatus for removing harmful constituents of the gases from said gas collecting means prior to release of gas into the atmosphere.

4. A refuse disposal system according to claim 3 wherein said combustion chamber further includes a tapered portion provided on the smaller end of said inner section and operative to define the flow of air and gases into said residue chamber.

5. A refuse disposal system comprising:
   means for shredding conglomerate refuse materials into a generally uniform material blend of shredded material having a substantially uniform size and burning characteristics;
   a rotary combustion chamber having an input end, an output end, and conveyor means therein for transport of shredded materials in a sinuous path between said input end and said output end;

means for establishing and maintaining a predetermined operating temperature within said combustion chamber;

a rotary residue chamber disposed adjacent said combustion chamber with one end in communication with the output end of said combustion chamber and including conveyor means therein for transport of materials from said combustion chamber through said residue chamber;

means disposed in operative arrangement with said residue chamber for collecting solid residue from the combustion process;

means disposed in operative arrangement with said residue chamber for collecting gases from the combustion process released from said residue chamber;

at least one rotary drying chamber disposed adjacent said combustion and residue chambers and having conveyor means therein for transporting shredded material from said shredding means to the input end of said combustion chamber, and including a helical vane provided on the inside surface thereof and of a pitch which decreases from the input end thereof to the output end thereof to provide a progressively increasing rate of travel of materials therein upon rotation of said drying chamber;

means for directing forced air into said at least one drying chamber, said combustion chamber and said residue chamber; and apparatus for removing harmful constituents of the gases from said gas collecting means prior to release of gas into the atmosphere.

6. A refuse disposal system according to claim 5 wherein at least one rotary drying chamber further includes a second helical vane provided on the inside surface thereof and interleaved with the other helical vane therein along a predetermined portion of said chamber adjacent the input end thereof.

7. A refuse disposal system according to claim 5 wherein said at least one rotary drying chamber includes means for introducing forced air into respective points along the length thereof.

8. A refuse disposal system comprising:

a rotary combustion chamber having an input end adapted to receive materials to be incinerated, an output end, and conveyor means therein for transport of materials in a sinuous path between said input end and said output end;

means for establishing and maintaining a predetermined operating temperature within said combustion chamber;

a rotary residue chamber disposed colinearly with said combustion chamber and having an input end in communication with the output end of said combustion chamber, and an output end having one or more openings for removal of unconsumed materials therefrom, and having conveyor means therein for transporting material from said combustion chamber along the length thereof to said output end;

an enclosure provided around said residue chamber and having a first portion for collecting gases of combustion from said residue chamber, and a second portion for collecting ash from said residue chamber;

at least one rotary drying chamber disposed adjacent said combustion and residue chambers and having an input end and an output end, a portion adjacent the output end thereof being arranged in proximity to said combustion chamber in a position to be heated by radiation therefrom, said drying chamber having one or more helical vanes provided therein for transporting along the length thereof material introduced into the input end thereof, said one or more vanes being operative to provide slower material travel in the portion of said drying chamber proximate to said combustion chamber;

means for introducing forced air into said at least one drying chamber at a plurality of points along the length thereof;

means for conveying dried material from the output end of said at least one drying chamber to the input end of said combustion chamber; and means for providing independently controllable rotation to each said combustion, residue and drying chambers.

9. A refuse disposal system according to claim 8 wherein the output end of said at least one drying chamber is in closed fluid communication with one input end of said combustion chamber such that forced air from said drying chamber flows into said combustion chamber.

10. A refuse disposal system according to claim 8 wherein said combustion chamber includes:

an outer conically shaped section and an inner conically shaped section disposed within said outer section in spaced apart relationship therewith, said inner section having a perforated wall surface, said outer section having a smaller end in communication with said residue chamber;

a first helical vane provided on the inner surface of said inner section of a pitch operative upon rotation of said combustion chamber to cause conveyance of materials from the smaller end thereof toward the larger end; and a second helical vane provided on the inner surface of said outer section of opposite pitch to the vane of said inner section to provide upon rotation of said combustion chamber conveyance of material from the larger end of said outer section to the smaller end thereof.

11. A refuse disposal system according to claim 10 wherein said residue chamber includes an elongated perforated cylindrical tube having an input end in communication with the smaller end of said outer section, and having a helical vane on the inside surface of said tube operative upon rotation of said tube to convey the residue of materials from said combustion chamber along said tube toward the output end thereof.

12. A refuse disposal system according to claim 11 wherein said at least one rotary drying chamber includes:

an elongated cylindrical tube;

a helical vane provided on the inner surface of said tube substantially along the full length thereof and having a pitch at the output portion of said tube which is shorter than the pitch at the input portion of said tube;

a plurality of air passages provided circumferentially around said tube and extending axially therealong, each of said passages communicating with the interior of said tube at one or more respective points along the length thereof; and means for introducing forced air to said plurality of passages during rotation of said tube.

13. In a refuse disposal system which includes a combustion chamber for incinerating refuse materials and apparatus operative for collecting solid residue and gases of combustion, a rotary drying chamber for drying refuse materials as they are conveyed to said combustion chamber, said drying chamber comprising:

an elongated cylindrical tube having an input end adapted to receive refuse materials, and an output end;

means for supporting said tube for rotation about its cylindrical axis;

a helical vane provided on the inside surface of said tube substantially along the length thereof and having a pitch along a portion adjacent the output end of said tube which is shorter than the pitch along a portion adjacent the input end thereof to provide slower material travel near the output end of said tube;

a plurality of air passages disposed circumferentially around said tube and extending axially along the length thereof said passages communicating with the interior of said tube at respective points along the length thereof; and means for introducing forced air into said passages during rotation of said tube.

14. The invention according to claim 3 wherein said helical vane provided on the inside surface of said tube is of a pitch which continuously decreases from the input end to the output end thereof.

15. The invention according to claim 13 including a second helical vane provided on the inside surface of said tube and interleaved with said helical vane provided therein along a predetermined portion of said tube commencing at the input end thereof.

16. The invention according to claim 13 including:
- a plurality of angle irons attached around the outside surface of said tube and each extending coaxially along the full length thereof, said angle irons and outside surface of said tube defining said plurality of air passages;
- a plurality of openings through said tube at spaced apart positions along the length of angle irons for providing communication between said air passages and the interior of said tube.

17. A refuse disposal system comprising:
means for shredding conglomerate refuse materials into a generally uniform material blend of shredded material having substantially uniform size and burning characteristics;
a rotary combustion chamber having an input end, an output end, and conveyor means therein for transport of shredded materials in a sinuous path between said input end and said output end;
means for establishing and maintaining a predetermined operating temperature within said combustion chamber;
a rotary residue chamber disposed adjacent said combustion chamber with one end in communication with the output end of said combustion chamber and including conveyor means therein for transport of materials from said combustion chamber through said residue chamber;
means disposed in operative arrangement with said residue chamber for collecting solid residue from the combustion process;
means disposed in operative arrangement with said residue chamber for collecting gases from the combustion process released from said residue chamber;
at least one rotary drying chamber disposed adjacent said combustion and residue chambers and having conveyor means therein for transporting shredded material from said shredding means to the input end of said combustion chamber;
said at least one rotary drying chamber including
an elongated cylindrical tube having an input end and an output end;
a helical vane provided on the inner surface of said tube substantially along the full length thereof and having a pitch near the output end thereof which is shorter than the pitch near the input end thereof;
a plurality of air passages provided around the outside of said tube, each of said passages communicating with the interior of said tube by means of a plurality of openings provided in the wall thereof at respective positions along the length of said tube; and
fluid coupling means at the input end of said tube for introducing forced air into said plurality of passages during rotation of said tube;
means for directing forced air into said at least one drying chamber, said combustion chamber and said residue chamber; and
apparatus for removing harmful constituents of the gases from said gas collecting means prior to release of gas into the atmosphere.

18. A refuse disposal system comprising:
means for shredding conglomerate refuse materials into a generally uniform material blend of shredded material having substantially uniform size and burning characteristics;
a rotary combustion chamber having an input end, an output end, conveyor means therein for transport of shredded materials in a sinuous path between said input end and said output end, and an inner and an outer section each having a helical vane therein and operative upon rotation of said chamber to convey said shredded material in said sinuous path in said inner and outer sections to the output end of said combustion chamber;
means for establishing and maintaining a predetermined operating temperature within said combustion chamber;
a rotary residue chamber disposed adjacent said combustion chamber and including an elongated perforated cylindrical tube having an input end in communication with the output end of said combustion chamber and having a helical vane provided on the inside surface of said tube and operative upon rotation of said residue chamber to convey the residue of said shredded material along said tube toward the output end thereof;
means disposed in operative arrangement with said residue chamber for collecting solid residue from the combustion process;
means disposed in operative arrangement with said residue chamber for collecting gases from the combustion process released from said residue chamber;
at least one rotary drying chamber disposed adjacent said combustion and residue chambers and having conveyor means therein for transporting shredded material from said shredding means to the input end of said combustion chamber;
means for directing forced air into said at least one drying chamber, said combustion chamber and said residue chamber; and
apparatus for removing harmful constituents of the gases from said gas collecting means prior to release of gas into the atmosphere.

* * * * *